United States Patent
Kaneko et al.

(10) Patent No.: US 7,812,710 B2
(45) Date of Patent: Oct. 12, 2010

(54) WIRELESS SENSOR AND METHOD OF CONTROLLING A WIRELESS SENSOR

(75) Inventors: Yu Kaneko, Yokohama (JP); Eiji Kamagata, Kamakura (JP); Toshiyuki Umeda, Inagi (JP); Masahiro Yoshikane, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 264 days.

(21) Appl. No.: 12/184,921

(22) Filed: Aug. 1, 2008

(65) Prior Publication Data

US 2009/0040039 A1 Feb. 12, 2009

(30) Foreign Application Priority Data

Aug. 7, 2007 (JP) ............... 2007-205844

(51) Int. Cl.
*G08B 1/00* (2006.01)
(52) U.S. Cl. ................................. 340/309.16
(58) Field of Classification Search ............ 340/309.16, 340/539.3, 10.1, 539.1, 825.69; 370/351; 709/238
See application file for complete search history.

(56) References Cited

U.S. PATENT DOCUMENTS

| | | | |
|---|---|---|---|
| 7,400,598 B1 * | 7/2008 | Humphries et al. | 370/315 |
| 2005/0249215 A1 * | 11/2005 | Kelsey et al. | 370/392 |
| 2005/0282505 A1 | 12/2005 | Umeda | |
| 2006/0126501 A1 * | 6/2006 | Ramaswamy | 370/221 |
| 2007/0121631 A1 * | 5/2007 | Krikorian et al. | 370/392 |
| 2008/0040507 A1 * | 2/2008 | Hsu et al. | 709/238 |
| 2008/0100491 A1 | 5/2008 | Umeda | |
| 2008/0158926 A1 | 7/2008 | Umeda | |

FOREIGN PATENT DOCUMENTS

JP 2007-5991 1/2007

OTHER PUBLICATIONS

Tian, et al., "*A Coverage-Preserving Node Scheduling Scheme for Large Wireless Sensor Networks*", iSENSE Project, Communications and Information Technology Ontario (CITO), 2002, 11 pps.

* cited by examiner

*Primary Examiner*—Phung Nguyen
(74) *Attorney, Agent, or Firm*—Ohlandt, Greeley, Ruggiero & Perle, L.L.P.

(57) ABSTRACT

A wireless sensor for a wireless sensor network includes a sensor unit performing sensing to sense environment and/or circumstance, first routing to send first sensing information to a server according to routing information, and second routing to send second sensing information from another wireless sensor to the server according to the routing information, when being supplied with power from a power source, a timer including a capacitor to be charged by the power and performs a time limit operation due to self-discharge thereof, a first control switch controlling power supplying to the timer to make the timer perform the time limit operation at a set time, a rectifier converting a radio signal from the another wireless sensor into power, and a second control switch starting power supplying to the sensor unit, upon receiving the control signal of the rectifier during the time limit operation.

12 Claims, 9 Drawing Sheets

| Originating sensor ID | Relay sensor ID1 | Relay sensor ID2 | Destination sensor ID |
|---|---|---|---|
| | | | |

WIRELESS SENSOR AND METHOD OF CONTROLLING A WIRELESS SENSOR

CROSS-REFERENCE TO RELATED APPLICATIONS

This application is based upon and claims the benefit of priority from prior Japanese Patent Application No. 2007-205844, filed Aug. 7, 2007, the entire contents of which are incorporated herein by reference.

BACKGROUND OF THE INVENTION

1. Field of the Invention

The present invention relates to a wireless sensor which performs sensing process and routing process and a method of controlling the activation of it.

2. Description of the Related Art

A sensor network is constructed from a number of wireless sensors which perform sensing process and routing process. With the sensor network, each of the wireless sensors individually carries out sensing process to obtain information and sends the information to the others. The information is collected by a server, thereby allowing complex situations or environments to be grasped.

With a sensor network described in "D. Tian and N D. Georganas. A Coverage Preserving Node Scheduling Scheme for Large Wireless Sensor Networks. Wireless Sensor Networks and Applications. pp. 32-41 (2002)", each wireless sensor notifies the other sensors of its sensing area. Each wireless sensor makes a decision of whether or not its sensing area overlaps with that of any of the other sensors and, in the presence of an overlap, turns off its power source. With the sensor network described in the related art, therefore, if the sensing areas of wireless sensors overlap each other, the overall power consumption of the network can be reduced.

With the sensor network described in the related art, if the sensing areas of wireless sensors do not overlap each other, the advantage of reducing power consumption cannot be achieved. That is, since most of the wireless sensors the sensing areas of which do not overlap with each other are in the steady activated state, a great reduction in the overall power consumption of the network cannot be expected.

BRIEF SUMMARY OF THE INVENTION

According to an aspect of the invention, there is provided a wireless sensor for a sensor network of wireless sensors, comprising: a power source; a sensor unit configured to perform (1) a sensing process to sense at least one of environment and circumstance, (2) a first routing process to send first sensing information obtained by the sensing process a server in accordance with routing information, and (3) a second routing process to send second sensing information from another wireless sensor to the server in accordance with the routing information, when being supplied with power from the power source; a timer set at a set time and including a capacitor to be charged by the power supplied from the power source and performs a time limit operation due to self-discharge of the capacitor; a first control switch which controls the supply of the power to the timer from the power source to make the timer perform the time limit operation at the set time; a rectifier which converts a radio signal from the another wireless sensor into power to output a control signal; and a second control switch which, upon receiving the control signal while the timer is performing the time limit operation, starts the supply of the power from the power source to the sensor unit.

DETAILED DESCRIPTION OF THE INVENTION

The embodiments of the present invention will be described hereinafter with reference to the accompanying drawings.

First Embodiment

Figure 1:
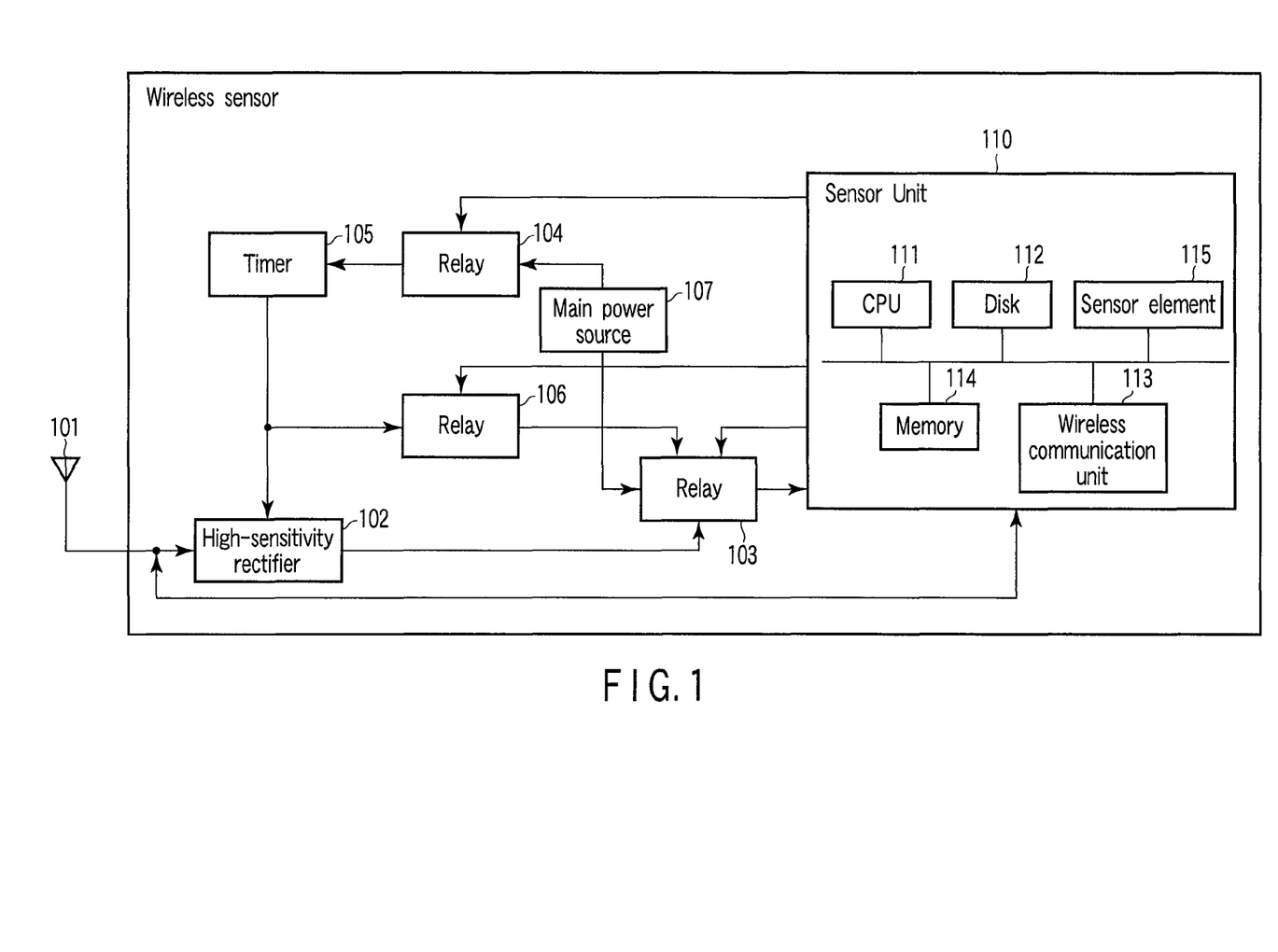
FIG. 1 is a block diagram of a wireless sensor according to a first embodiment.

As shown in FIG. 1, a wireless sensor according to a first embodiment of the present invention is equipped with an antenna 101, a high-sensitivity rectifier 102, relays 103, 104 and 105 as control switches, a timer 105, a power source 107, and a sensor unit 110. The sensor unit 110 includes a CPU 111, a disk 112, a wireless communication unit 113, a memory 114, and a sensor element 115. The sensor element 115 detects a physical quantity, such as temperature, humidity, pressure, etc., or position information.

The antenna 101 receives radio signals from other wireless sensors. The high-sensitivity rectifier 102 converts a radio signal received by the antenna 101 into electric power, which is used as a control signal to control the relay 103.

The relay 103, which is, for example, a solid-state relay formed of a semiconductor device, controls the supply of power from the power source 107 to the sensor unit 110. When the wireless sensor goes into the standby state, the relay 103 stops the supply of power from the power source 107 to the sensor unit 110 on the basis of power supplied from the sensor unit 110. When the wireless sensor enters the activated state, the relay 103 initiates the supply of power from the power source 107 to the sensor unit 110 on the basis of power supplied from the high-sensitivity rectifier 102 through the relay 106. The relay 104 is controlled by the sensor unit 110 to control the supply of electric charge from the power source 107 to the timer 105.

The timer 105 is implemented by a device which is low in power consumption and simple in construction utilizing self-discharge of a capacitor by way of example. Specifically, the timer 105 performs a time limit operation utilizing the time until electric charge supplied through the relay 104 has been dissipated through self-discharge as a set time. That is, a quantity of electric charge corresponding to the set time is supplied from the power source 107 to the timer 105 through the relay 104 controlled by the sensor unit 110.

The relay 106 is energized or de-energized by the sensor unit 110. When energized, the relay 106 energizes or de-energizes the relay 103 in accordance with an output of the timer 105.

The power source 107 supplies power to the sensor unit 110 and the timer 105. The supply of power from the power source 107 to the sensor unit 110 and to the timer 105 is controlled, as described above, by the relays 103 and 104, respectively.

The sensor unit 110 performs main operations, such as sensing process and routing process, of the wireless sensor according to this embodiment. For example, the sensor unit 110 is configured by interconnecting the CPU 111, the disk 112, the wireless communication unit 113, the memory 114, and the sensor element 115 by a bus.

The CPU 111 carries out various processes, such as numerical operations, condition decision, and receiving and sending input/output data. The disk 112 is stored with a variety of pieces of information, including sensor ID, sensing time information, routing start time information, and server information. Here, the routing process is a process for the wireless sensor to send information obtained by sensing process (hereinafter referred to simply as sensing information) to the server in accordance with routing information to be described later.

The wireless communication unit 113 carries out various processes, such as power amplification of radio signals, filtering, frequency conversion, modulation/demodulation, etc., which are required to send or receive data to or from other wireless sensors. The memory 114 temporarily stores data required when the CPU 111 performs such processes as described above.

Figure 2:
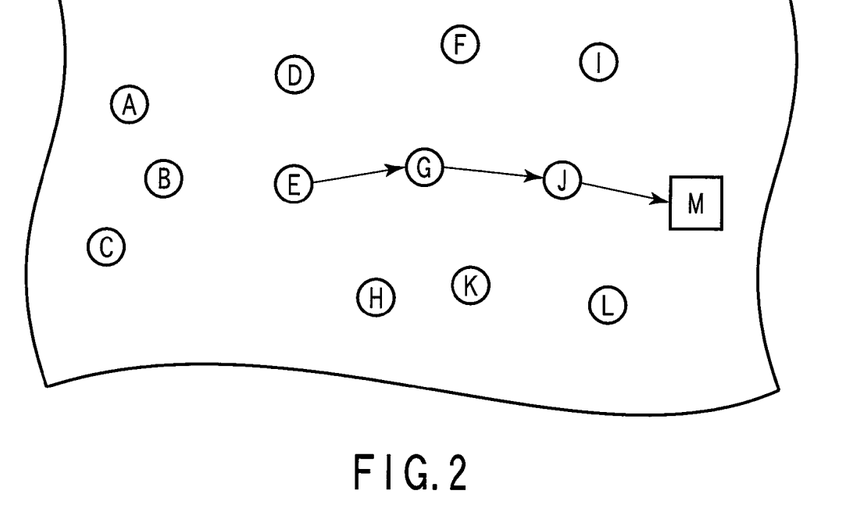
FIG. 2 shows an example of a sensor network constructed from the wireless sensors shown in FIG. 1.

Reference is next made to FIG. 2 to describe a sensor network constructed from wireless sensors each of which is constructed in accordance with this embodiment.

In FIG. 2, circles denote a group of wireless sensors A to L each of which corresponds to the wireless sensor shown in FIG. 1 and a rectangle denotes a server M. The server M collects sensing information from the wireless sensors A to L. The server M stores the sensor IDs of the sensors A to L that it manages. The server M may be configured identically to the wireless sensor shown in FIG. 1. In the description which follows, the server M is assumed to have the same configuration as the wireless sensor shown in FIG. 1.

The disk 112 of the server M stores the sensor IDs of the respective wireless sensors A to L. The wireless sensors A to L perform the so-called multi-hop routing. In order for each of the wireless sensors A to L to perform sensing process and routing process in the sensor network shown in FIG. 2, it is required to make the following preparations in advance.

In the sensor network shown in FIG. 2, in order for each wireless sensor to perform routing process, it is required to create routing information from it to the server. The wireless communication unit 113 of a wireless sensor which is to create routing information sends to surrounding wireless sensors a route search request containing the originating sensor ID and the destination sensor ID. The surrounding wireless sensors refer to those which exist in the available coverage area of the wireless communication unit 113. For example, when the wireless sensor E creates routing information, its wireless communication unit 113 sends to the surrounding wireless sensors B, D, G and H a route search request with the sensor E as the originator and the server M as the destination.

Figure 3:
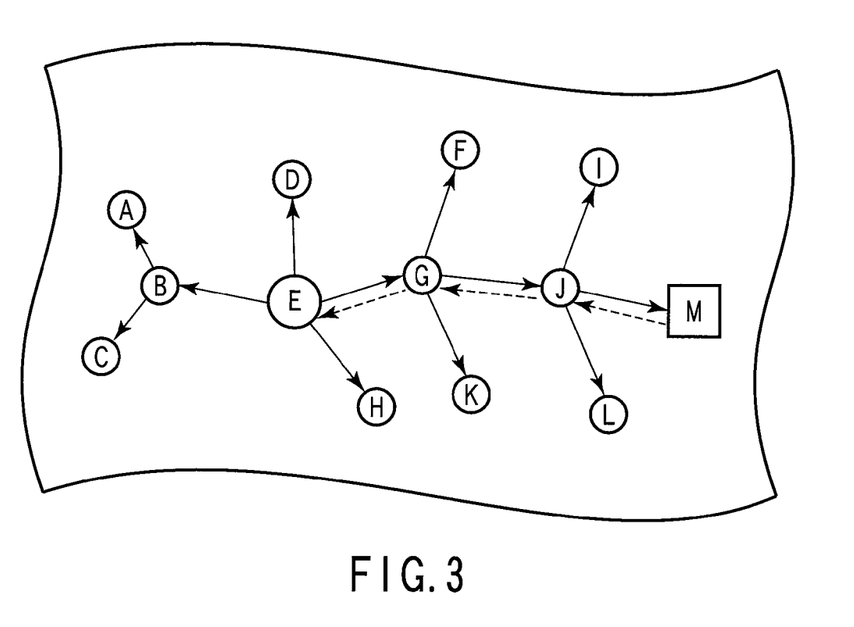
FIG. 3 is a diagram illustrating the creation of routing information in the sensor network shown in FIG. 2.

The CPU 111 of a wireless sensor which has received the route search request refers to the disk 112 or the memory 114 to determine whether or not routing information to the wireless sensor indicated by the destination sensor ID is stored on the disk 112. If the routing information is stored, then the wireless communication unit 113 of that wireless sensor sends the routing information to surrounding wireless sensors. If, on the other hand, the routing information is not stored, then the CPU 111 reads from the disk 112 its sensor ID and adds it to the received route search request as relay sensor ID. The wireless communication unit 113 sends the resulting route search request to surrounding wireless sensors. In the example of FIG. 3, the wireless sensors B, D and G do not have the routing information to the server M on the disk 112 or the memory 114 and therefore add their respective sensor IDs to the route search request as relay sensor IDs. Each of the wireless sensors B, D, G and H then sends the resulting route search request to its surrounding wireless sensors.

Figure 4:
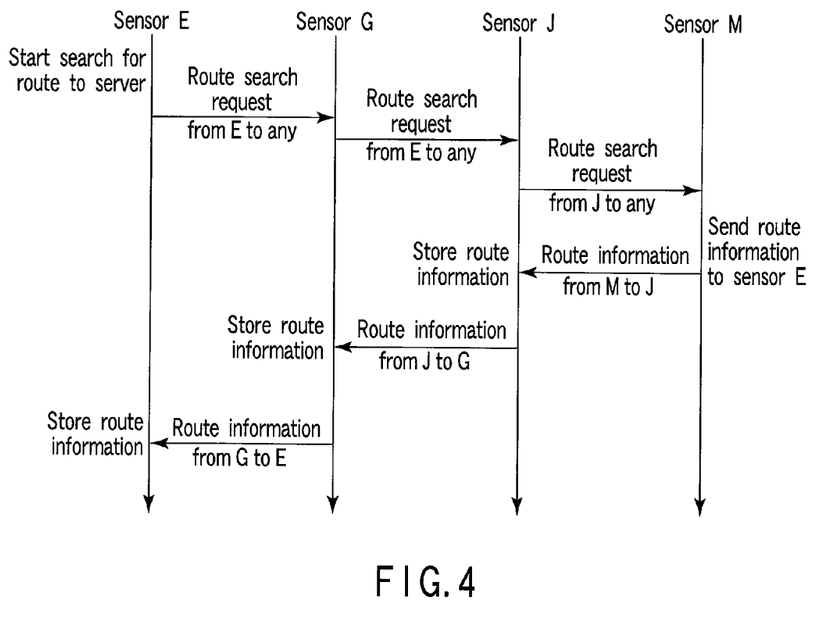
FIG. 4 is a diagram of a sequence illustrating the flow of creation of routing information in the sensor network of FIG. 2.

By repeating the above process, the route search request from the wireless sensor E arrives at the server M as shown in FIG. 4. From the received route search request, the server M can identify the wireless sensor E which is the originating sensor and the wireless sensors G and J which are relay sensors.

Figure 5:
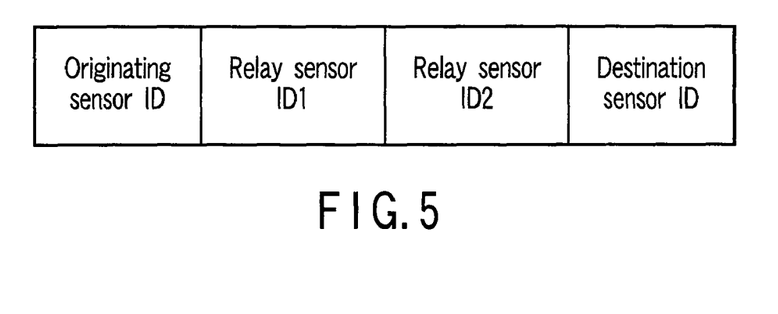
FIG. 5 shows one example of data structure of the routing information shown in FIG. 4.

Next, the server M responds to the route search request to send routing information containing the originating sensor ID, the relay sensor IDs and the destination sensor ID to the wireless sensor J which is the nearest relay sensor. The CPU of the server M stores the routing information on the disk 112 or the memory 114 and uses it in sending a message to the wireless sensor E, G, or J. FIG. 5 shows an example of data structure of routing information when the relay sensors are two in number. Of course, the number of relay sensors may be zero, one, or more than two.

Upon receiving the routing information, the wireless sensor J stores it on its disk 112 or memory 114. In addition, the wireless sensor J sends the routing information to the wireless sensor G which is the nearest relay sensor. The wireless sensor G stores the received routing information on its disk 112 or memory 114. The wireless sensor G then sends the routing information to the wireless sensor E which is the originating sensor of the route search request.

By creating the routing information in the above manner, the originating and relay sensors can confirm routing information to the server and the server can confirm routing information to the originating and relay sensors. The above routing information creation procedure is merely exemplary. Other procedures which have already been proposed may be used.

Upon termination of the creation of routing information by all the wireless sensors that make up the sensor network, each wireless sensor performs a process of sharing routing times for the server and relay sensors in accordance with the routing information.

The CPU 111 of each wireless sensor reads its routing start time information and the routing information from the disk 112 or the memory 114. The wireless communication unit 113 then sends the routing time T toward the server in accordance with the routing information. When the wireless sensor E performs the routing time sharing process, its wireless communication unit 113 notify the wireless sensor G of the routing time T in accordance with the routing information. The routing time T may involve two or more times.

Figure 6:
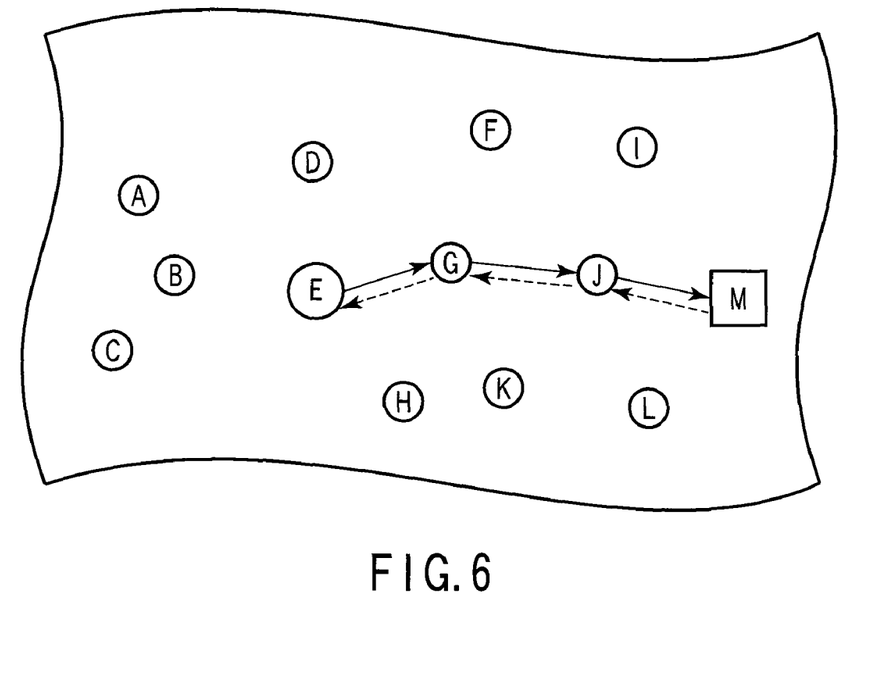
FIG. 6 is a diagram illustrating sharing of the routing time in the sensor network shown in FIG. 2.
Figure 7:
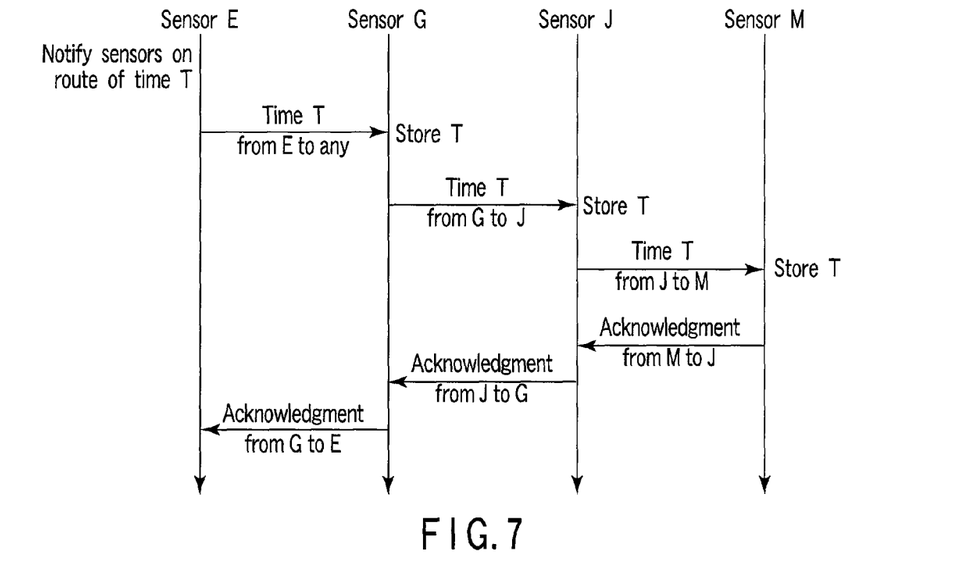
FIG. 7 is a diagram of a sequence illustrating the flow of sharing of the routing time in the sensor network shown in FIG. 2.

Upon being informed of the routing time T, each relay sensor stores the routing time on its disk 112 or memory 114 as the time that it participates in routing process as a relay sensor (hereinafter referred to simply as the routing participation time). Each relay sensor then transfers the routing time T to the next relay sensor or the server in accordance with the routing information. With the above example, as shown in FIGS. 6 and 7, the sensor G transfers the routing time T to the sensor J, which in turn transfers the time T to the server M with the routing time T stored in each sensor.

Upon receiving the routing time T, the server M stores it on the disk 112 or the memory 114 and creates an acknowledgment. The server then sends the acknowledgment to the routing time originating sensor in accordance with the routing information. With the above example, as shown in FIGS. 6 and 7, the acknowledgment is transferred from the server M through the sensors J and G to the sensor E in accordance with the routing information.

As described above, the routing time sharing process allows each wireless sensor that makes up the sensor network to confirm the routing participation time. After the termination of the sharing process, therefore, each wireless sensor comes to have three pieces of time information: (1) the routing participation time; (2) the time it carries out sensing process (hereinafter referred to simply as the sensing time); and (3) the time it starts routing process (hereinafter referred to simply as the routing start time). As will be described later, the wireless sensor according to this embodiment is placed in the standby state during a period when no operation is needed to thereby save power and goes into the activated state when any of the three times is reached.

Here, the standby state of the wireless sensor is the state in which no power is supplied from the power source 107 to the sensor unit 110. The activated state is the state in which power is supplied from the power source 107 to the sensor unit 110.

Figure 8:
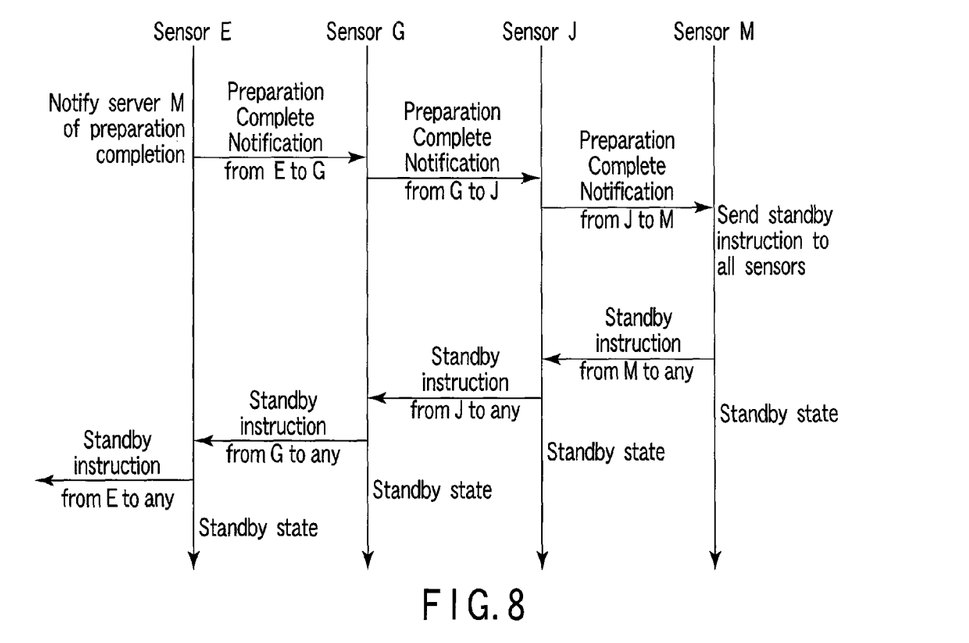
FIG. 8 is a diagram of a sequence illustrating the flow of simultaneous standby processing of the sensors in the sensor network of FIG. 2.

Upon receiving the acknowledgment from the server to confirm success in routing time sharing, the CPU 111 of each wireless sensor creates a sensor ID-containing notification indicating that it is ready (preparation completion notification). The wireless sensor then sends through its wireless communication unit 113 that preparation completion notification towards the server in accordance with the routing information. The preparation complete notification is transferred via a relay sensor or sensors to the server in the same manner as described above. Upon referring to the sensor IDs contained in the preparation completion notification and confirming that preparation completion notifications have been received from all the wireless sensors that make up the sensor network, the CPU 111 of the server creates a standby instruction. The server then sends the standby instruction to all the wireless sensors through the wireless communication unit 113 as shown in FIG. 8.

Upon receipt of the standby instruction, each wireless sensor transfers it to surrounding wireless sensor or sensors. After the transfer of the standby instruction, each wireless sensor goes into the standby state. Specifically, first, each wireless sensor refers to the routing participation time, the sensing time, and the routing start time stored on its disk 112 or memory 114 to determine the next activation time.

Upon determining the next activation time, the sensor unit 110 of each wireless sensor controls the supply of electric charge from the power source 107 to the timer 105 so that timer runout occurs at that activation time (time limit operation). Specifically, the sensor unit 110 energizes the relay 104 to start the supply of electric charge from the power source 107 to the timer 105 and supply such an amount of electric charge that timer runout occurs at the activation time and then de-energizes the relay to stop the supply of electric charge.

Next, if the activation time is the routing participation time, the sensor unit 110 energizes the relay 106. In the case of the sensing time or the routing start time, the sensor unit de-energizes the relay 106. The sensor unit next de-energizes the relay 103 to stop the supply of power from the power source 107 to it. The wireless sensor is thus placed in the standby state.

A description is given below of the operation of each component when the wireless sensor goes from the standby state into the activated state. As described above, the high-sensitivity rectifier 102 converts a radio signal received by the antenna 101 into electric power. By energizing relay 103, therefore, the supply of power from the power source 107 to the sensor unit 110 can be started. However, trying to control the relay 103 with the high-sensitivity rectifier 102 alone would cause a wireless sensor which is not associated with the routing path to be activated by a radio signal from a surrounding wireless sensor. This is because the rectifier converts a radio signal received by the antenna 101 into electric power regardless of its contents. For this reason, the wireless sensor of this embodiment is configured to incorporate a logic circuit into the high-sensitivity rectifier 102 so that the rectifier energizes the relay 103 only when timer runout occurs. The logic circuit can be readily formed using an XOR or AND circuit and hence its description is omitted.

When the set time is approaching, charge stored in the timer 105 is dissipated through self-discharge, causing the signal applied to the rectifier 102 and the relay 106 to vary. As a result, the relay 103 is energized by the signal from the rectifier, allowing the supply of power from the power source 107 to the sensor unit 110 to be started and causing the wireless sensor to go into the activated state. If the activation time is the sensing time or routing start time, the high-sensitivity rectifier 102 cannot be used because no radio signal is received from another wireless sensor. As described above, however, since the relay 106 is energized, it enables the relay 103 at the occurrence of timer runout to start the supply of power from the power source 107 to the sensor unit 110. Thus, the wireless sensor is allowed to go into the activated state.

As described above, when preparations are complete in each wireless sensor that makes up the sensor network, timer runout occurs when the sensing time or routing start time stored on the disk 112 arrives, thereby causing the relay 106 to energize the relay 103. Then, power is supplied from the power source 107 to the sensor unit 110, allowing the wireless sensor to go into the activated state. A known process can be applied to the sensing process by the wireless sensor of this embodiment and its description is therefore omitted. In the description which follows, the routing process will be mainly set forth.

A wireless sensor which starts routing sends an activating signal to surrounding wireless sensors in order to activate the next relay sensor. This activating signal may be transmitted at regular intervals two or more times. A relay sensor which has gone into the activated state in response to the activating signal sends an acknowledgment that it has been activated. Upon receiving the acknowledgment, the wireless sensor sends sensing information. Upon receiving the sensing information, the relay sensor activates the next relay sensor. Thus, the sensing information is transferred to the server.

Upon receiving the sensing information, the server stores it on the disk 112 or in the memory 114. The server then sends to the originating sensor an acknowledgment that the sensing information has been received. The acknowledgment arrives at the originating sensor via the relay sensors. The originating sensor sends toward the server a standby instruction to cause sensors on the routing path to stand by, then sets the timer 105 and goes into the standby state. Likewise, the relay sensors also transfer the standby instruction, then set the timer and go into the standby state. Finally, the server receives the standby instruction, then sets the timer and goes into the standby state.

Figure 9:
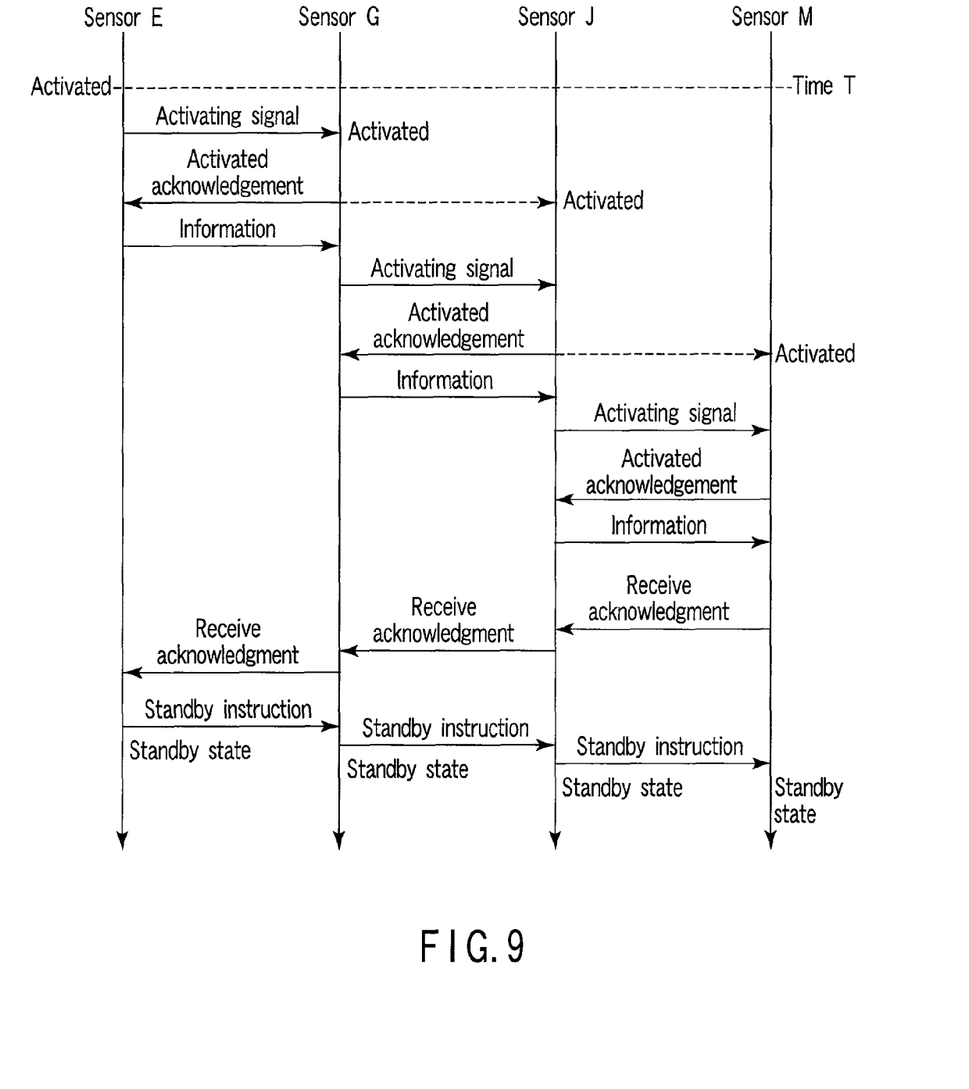
FIG. 9 is a diagram of a sequence illustrating the flow of a routing process in the sensor network of FIG. 2.

Reference is next made to FIG. 9 to describe the routing process by the wireless sensor E. When the routing time T comes, the timer 105 of the wireless sensor which is to start routing runs out, whereupon the relay 106 energizes the relay 103. Thereby, the supply of power from the power source 107 to the sensor unit 110 is initiated, so that the wireless sensor E goes into the activated state.

Next, the wireless sensor E sends an activating signal to surrounding wireless sensors in order to activate the wireless sensor G. The timer 105 of the wireless sensor G ran out at the routing time T; therefore, its high-sensitivity rectifier 102 can convert the received activating signal into electric power to energize the relay 103. Thus, the supply of power from the power source 107 to the sensor unit 110 is started, whereby the wireless sensor G is allowed to go into the activated state. The activating signal will also arrive at wireless sensors other than the wireless sensor G. There is therefore the possibility that the activating signal is converted into power in their respective high-sensitivity rectifiers 102. However, wireless sensors in which no runout of timer 105 has occurred cannot go into the activated state. Accordingly, only the wireless sensors which reside on the routing path are activated.

The wireless sensor G then sends to the wireless sensor E an activate acknowledgment that it has been activated. The wireless sensor J is present within the service area of the wireless sensor G and its timer 105 ran out at the routing time T. Therefore, the wireless sensor G is placed in the activated state by the activate acknowledgment from the wireless sensor G.

Upon receiving the activate acknowledgment from the wireless sensor G the wireless sensor E sends sensing information to the wireless sensor G. Upon receiving the sensing information from the wireless sensor E, the wireless sensor G sends an activating signal to the wireless sensor J. Although the wireless sensor J has already been placed in the activated state as stated above, it is required that each relay sensor send an activating signal. This is because it is not until the wireless sensor of this embodiment receives the activate acknowledgment that it transfers the sensing information.

Upon receiving the activating signal from the wireless sensor G, the wireless sensor J sends an activate acknowledgment to the wireless sensor G. This acknowledgment allows the server M to go into the activated state. Upon receiving the activate acknowledgment from the wireless sensor J, the wireless sensor G transfers the sensing information from the wireless sensor E to the wireless sensor J.

Upon receiving the sensing information from the wireless sensor G, the wireless sensor J sends an activating signal to the server M, whereupon the server sends an activate acknowledgment. Upon receiving the activate acknowledgment from the server M, the wireless sensor J transfers the sensing information to the server. The server M stores the sensing information on its disk 112 or in memory 114.

The server M then sends a receive acknowledgment to the wireless sensor J. Upon receiving the acknowledgment from the server M, the wireless sensor J transfers the acknowledgment to the wireless sensor G, which in turn transfers it to the wireless sensor E.

Upon receiving the acknowledgment from the server M, the wireless sensor E sends a standby instruction to the wireless sensor G. After the transmission of the standby instruction, the wireless sensor E goes into the standby state until the next activation time arrives.

The wireless sensor G transfers the standby instruction to the wireless sensor J, which in turn transfers the standby instruction to the server M. After the transfer of the standby instruction, the wireless sensors G and J go into the standby state until the next activation time arrives as stated above. Also, the server M which has received the standby instruction goes into the standby state until the next activation time arrives.

As described above, the wireless sensor of this embodiment is configured to manage the activation time through the use of the timer 105 and stop the supply of power from the power source 107 to the sensor unit 110 during a time interval when no operation is required. Therefore, the wireless sensor of this embodiment allows little wasteful activation to be realized and the overall power consumption of the sensor network to be reduced.

Second Embodiment

The sensor network which is made up of wireless sensors according to a second embodiment of the present invention differs from the one of the first embodiment in the routing time sharing process and the routing process. In the description which follows, the routing time sharing and routing processes will be mainly set forth.

In the sensor network made up of wireless sensors of this embodiment, the wireless sensors on a routing path share routing participation times which are displaced from one another by a given time t. Specifically, the CPU 111 of a wireless sensor to start routing process first determines the given time t. The time t is taken here to be longer than the time it takes for a wireless sensor to change from the standby state to the activated state. Next, the wireless sensor sends the routing time T and the given time t to the first relay sensor in accordance with routing information.

The first relay sensor stores the received routing time T on its disk 112 or in memory 114 as the routing participation time. The first relay sensor sends the routing time T and the given time t to the second relay sensor.

The second relay sensor stores the routing time (T+t), which is the sum of the routing time T and the given time t, on its disk 112 or in memory 114 as the routing participation time.

Next, the second relay sensor sends the routing time (T+t) and the given time t to the third relay sensor. Thus, the given time t is added to the routing time with each relay sensor. Assuming the number of relay sensors to be n, therefore, the routing participation time to be stored on the disk 112 or in the memory 114 in the server will be (T+nt).

Figure 10:
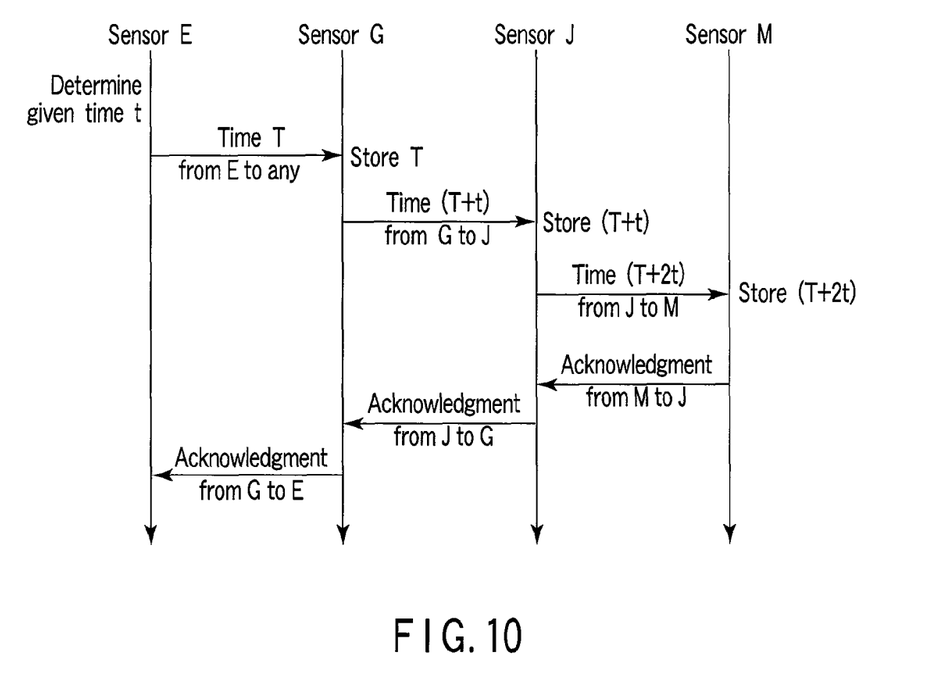
FIG. 10 is a diagram of a sequence illustrating the flow of sharing of routing times in a sensor network constructed from wireless sensors according to a second embodiment.

Reference is next made to FIG. 10 to describe the routing time sharing process by the wireless sensor E. First, the CPU 111 determines the given time t. The wireless communication unit 113 sends the routing time T and the given time t to the wireless sensor G in accordance with routing information.

Upon receiving the routing time T and the given time t, the wireless sensor G stores the routing time T as the routing participation time on its disk 112 or in memory 114. The wireless sensor G then sends the routing time T and the given time t to the wireless sensor J in accordance with the routing information.

Upon receiving the routing time T and the given time t, the wireless sensor J stores (T+t) as the routing participation time, which is the sum of the routing time T and the given time t, on its disk 112 or memory 114. The wireless sensor J then sends the routing time (T+t) and the given time t to the server M in accordance with the routing information.

Upon receiving the routing time (T+t) and the given time t, the server M stores (T+2t), which is the sum of the routing time (T+t) and the given time t, on its disk 112 or memory 114 as the routing participation time. The server M then sends an acknowledgment to the wireless sensor J.

The wireless sensor J transfers the acknowledgment to the wireless sensor G in accordance with the routing information. The wireless sensor G then transfers the acknowledgment to the wireless sensor E in accordance with the routing information. When the wireless sensor E receives the acknowledgment, the process of sharing the routing time associated with the wireless sensor E is complete.

Next, a description is given of the routing process of the sensor network made up of the wireless sensors according to this embodiment. Each wireless sensor sends sensing information the given time t after the activate acknowledgment has been received. The routing process by the wireless sensor E will be described below with reference to FIG. 11.

Figure 11:
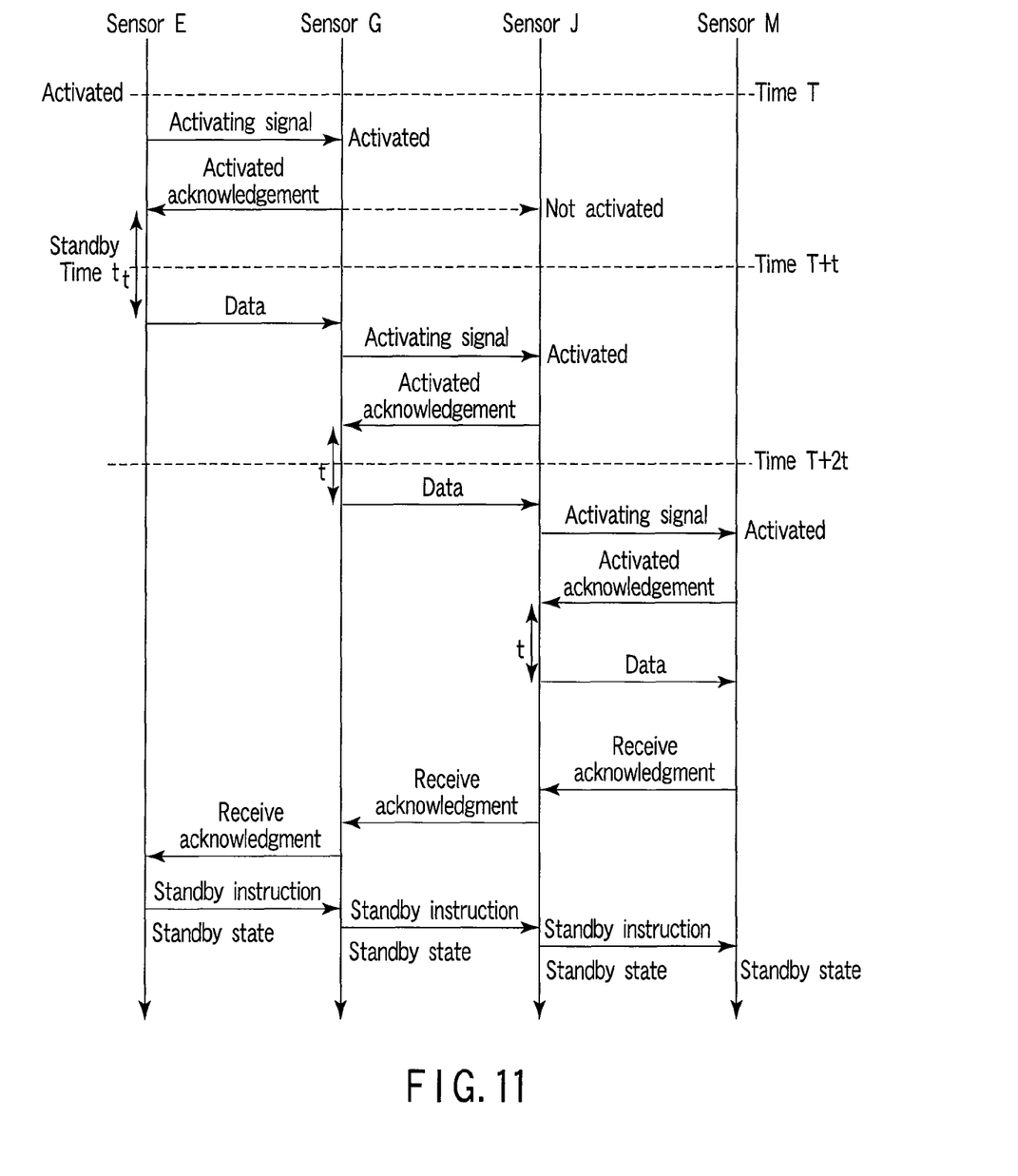
FIG. 11 is a diagram of a sequence illustrating the flow of a routing process in the sensor network constructed from wireless sensors according to the second embodiment.

When the routing start time T arrives, the timer 105 in the wireless sensor E runs out, which causes the relay 106 to energize the relay 103. As a result, the supply of power from the power source 107 to the sensor unit 110 is started to allow the wireless sensor E to go into the activated state. The wireless sensor E then sends an activating signal to the wireless sensor G in accordance with the routing information.

In the wireless sensor G in which the timer 105 ran out at time T its high-sensitivity rectifier 102 converts the activating signal received by the antenna 103 into power to energize the relay 103. As a result, power is supplied from the power source 107 to the sensor unit 110, allowing the wireless sensor G to go into the activated state.

The wireless sensor G then sends an activate acknowledgment to the wireless sensor E. In the first embodiment described above, this activate acknowledgment causes the wireless sensor J to go into the activated state. In the second embodiment, however, the wireless sensor J does not go into the activated state because its routing participation time is (T+t) and hence runout of timer 105 has not yet occurred.

Upon the elapse of the given time t since reception of the activate acknowledgment, the wireless sensor E sends sensing information to the wireless sensor G in accordance with the routing information. Here, the reason why the wireless sensor E waits until the given time t elapses is to cause timer runout to occur with certainty in the wireless sensor J before receiving the activating signal from the wireless sensor G.

Upon receiving the sensing information, the wireless sensor G sends an activating signal to the wireless sensor J in accordance with the routing information. As described above, the wireless sensor E becomes activated after time T and, after that, the wireless sensor E waits until the given time t elapses. Therefore, the routing participation time (T+t) of the wireless sensor J has elapsed with certainty and its timer has run out before it receives the activating signal. Accordingly, the high-sensitivity rectifier 102 of the wireless sensor J converts the activating signal received by the antenna 101 into electric power and energizes the relay 103 to supply power from the power source 107 to the sensor unit 110. The wireless sensor J thus goes into the activated state.

The wireless sensor J then sends an activate acknowledgment to the wireless sensor G. In the first embodiment, this activate acknowledgment causes the server M to go into the activated state. In the second embodiment, however, the server M does not go into the activated state because its routing participation time is (T+2t) and hence timer runout has not yet occurred.

Upon the elapse of the given time t since reception of the activate acknowledgment, the wireless sensor G sends the sensing information to the wireless sensor J in accordance with the routing information. Here, the reason why the wireless sensor G waits until the given time t elapses is the same as the aforementioned reason: it is to cause runout of timer 105 to occur with certainty in the server M before it receives an activating signal from the wireless sensor J.

Upon receiving the sensing information, the wireless sensor J sends an activating signal to the server M in accordance with the routing information. As described above, before the wireless sensor J sends the activating signal, the time (T+2t) has elapsed and runout of timer 105 has occurred in the server M. Accordingly, the high-sensitivity rectifier 102 of the server M converts the activating signal received by the antenna 101 into electric power and energizes the relay 103 to supply power from the power source 107 to the sensor unit 110. The server M thus goes into the activated state.

The server M then sends an activate acknowledgment to the wireless sensor J. Upon the elapse of the given time t since reception of the activate acknowledgment, the wireless sensor J sends the sensing information to the server M in accordance with the routing information. The sensing information is stored on the disk 112 or in the memory 114. The subsequent processing is the same as that in the first embodiment and hence its description is omitted.

As described above, the wireless sensors of this embodiment are configured to share routing participation times displaced from one another by a given time t and send sensing information upon the elapse of the given time since reception of an activate acknowledgment. According to the second embodiment, therefore, wireless sensors that participate in routing process are allowed to be placed in the standby state until immediately before they receive sensing information. Accordingly, the second embodiment can further reduce the overall power consumption of the sensor network as compared with the first embodiment.

Third Embodiment

The sensor network which is made up of wireless sensors according to a third embodiment of the present invention differs from the one of the second embodiment in the routing process. In the description which follows, the routing process will be mainly set forth.

With the sensor network which is made up of wireless sensors according to the second embodiment, a wireless sensor to start routing process sends a standby instruction toward the server to thereby cause wireless sensors on the routing path to go into the standby state. If, however, when the wireless sensors on the routing path are participating in a different routing process at the same time, they followed the standby instruction, the different routing process would not be carried out correctly.

The wireless sensors of this embodiment append a routing identifier to sensing information, a receive acknowledgment, and a standby instruction. Each wireless sensor stores a routing identifier on its disk 112 or memory 114 in sending or receiving sensing information and deletes that identifier from the disk 112 or memory 114 in sending or receiving a standby instruction. This allows each wireless sensor to grasp the completion/incompletion of each routing process it is participating in. That is, each wireless sensor waits for the next standby instruction without going into the standby state as long as the routing identifier remains on its disk 112 or memory 114.

Figure 12:
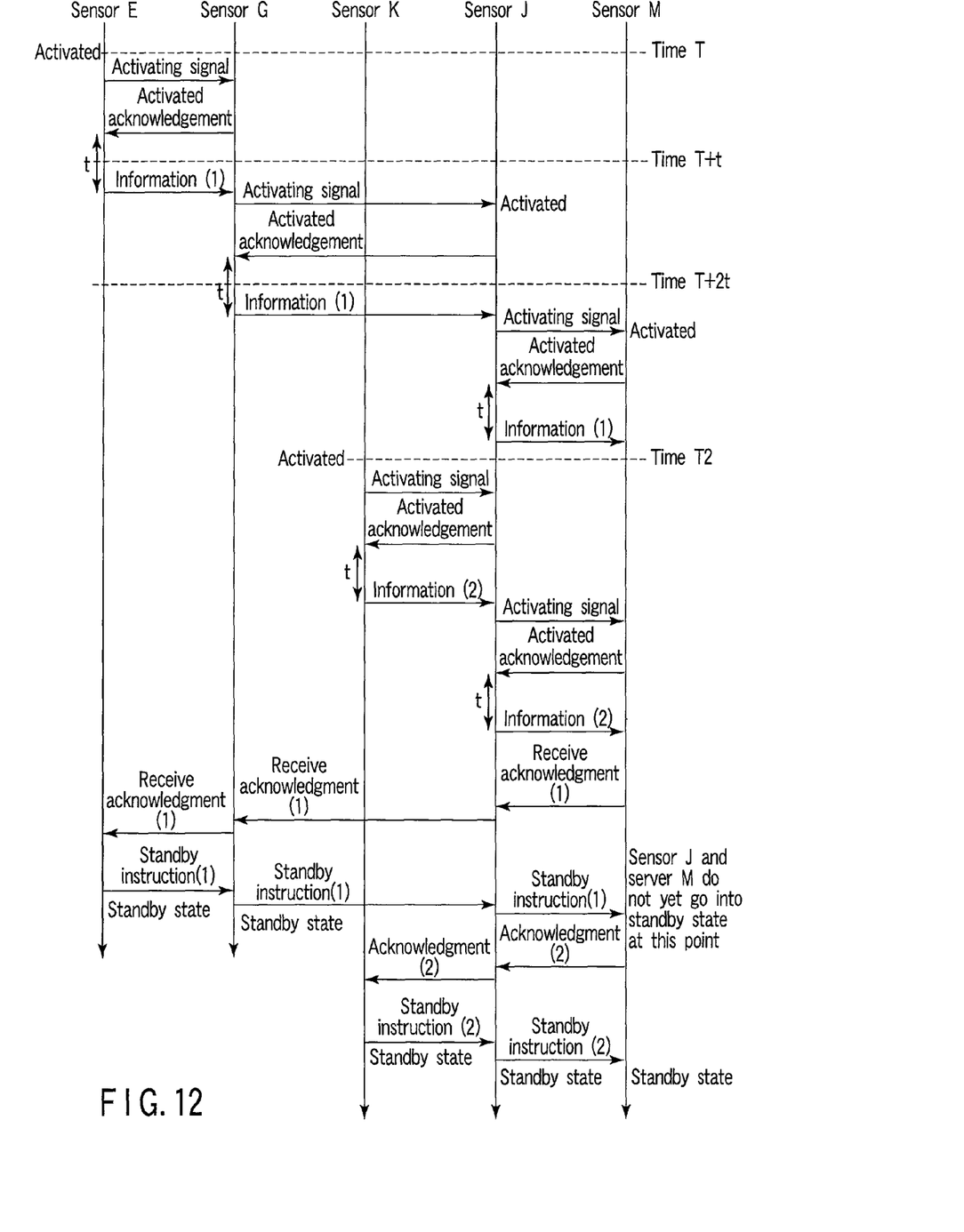
FIG. 12 is a diagram of a sequence illustrating the flow of a routing process in a sensor network constructed from wireless sensors according to a third embodiment.

The routing process by wireless sensors E and K will be described below with reference to FIG. 12. It is assumed here that the wireless sensor K has also created routing information (from the sensor K through the sensor J to the server M) in the same manner as the wireless sensor E and performed the routing time (T2) sharing process.

At the routing start time T, the timer 105 in the wireless sensor E runs out, which causes the relay 106 to energize the relay 103. As a result, the supply of power from the power source 107 to the sensor unit 110 is started to allow the wireless sensor E to go into the activated state. The wireless sensor E then sends an activating signal to the wireless sensor G in accordance with the routing information.

In the wireless sensor G in which its timer 105 ran out at the time T, its high-sensitivity rectifier 102 converts the activating signal received by the antenna 103 into power and energizes the relay 103. As a result, power is supplied from the power source 107 to the sensor unit 110, allowing the wireless sensor G to go into the activated state.

The wireless sensor G then sends an activate acknowledgment to the wireless sensor E. Upon the elapse of the given time t since reception of the activate acknowledgment, the wireless sensor E sends sensing information (1), with the routing identifier (1) appended, to the wireless sensor G in accordance with the routing information. Here, the sensor ID of the wireless sensor E is used as the routing identifier (1). In the wireless sensor E, the routing identifier (1) is stored on its disk 112 or in memory 114.

Upon receiving the sensing information, the wireless sensor G stores the routing identifier (1) appended to the sensing identifier on its disk 112 or memory 114. Next, the wireless sensor G sends an activating signal to the wireless sensor J in accordance with the routing information. The high-sensitivity rectifier 102 of the wireless sensor G converts the activating signal received by the antenna 101 into power to energize the relay 103. As a result, the power is supplied from the power source 107 to the sensor unit 110, allowing the wireless sensor J to go into the activated state.

The wireless sensor J then sends an activate acknowledgment to the wireless sensor G. Upon the elapse of the given time t since the reception of the activate acknowledgment, the wireless sensor G transfers the sensing information (1) to the wireless sensor J in accordance with the routing information.

Upon receiving the sensing information (1), the wireless sensor J stores the routing identifier (1) appended to the sensing information on its disk 112 or in memory 114. Next, the wireless sensor J sends an activating signal to the server M in accordance with the routing information. The high-sensitivity rectifier 102 of the server M converts the activating signal received by the antenna 101 into power to energize the relay 103. As a result, the power is supplied from the power source 107 to the sensor unit 110, allowing the sensor M to go into the activated state.

The server M then sends an activate acknowledgment to the wireless sensor J. Upon the elapse of the given time t since reception of the activate acknowledgment, the wireless sensor J sends the sensing information (1) to the server M in accordance with the routing information. In the server M, the sensing information (1) and the routing identifier (1) are stored on its disk 112 or in memory 114. It is assumed here that the routing start time T2 of the wireless sensor K has arrived.

At the routing start time T2, the timer 105 of the wireless sensor K runs out, causing the relay 106 to energize the relay 103. As a result, the power is supplied from the power source 107 to the sensor unit 110 to allow the wireless sensor K to go into the activated state. The wireless sensor K then sends an activating signal to the wireless sensor J in accordance with the routing information.

Upon receiving the activating signal, the wireless sensor J sends an activate acknowledgment to the wireless sensor K. Upon the elapse of the given time t since reception of the activate acknowledgment, the wireless sensor K sends sensing information (2), with routing identifier (2) appended, to the wireless sensor J in accordance with the routing information.

Upon receiving the sensing information (2), the wireless sensor J stores the routing identifier (2) appended to the sensing information (2) on its disk 112 or in memory 114. Next, the wireless sensor J sends an activating signal to the server M in accordance with the routing information.

Upon receiving the activating signal, the server M sends an activate acknowledgment to the wireless sensor J. Upon the elapse of the given time t since reception of the activate acknowledgment, the wireless sensor J sends the sensing information (2) to the server M in accordance with the routing information. In the server M, the sensing information (2) and the routing identifier (2) are stored on its disk 112 or in memory 114.

The server M then sends a receive acknowledgment (1), with the routing identifier (1) appended, to the wireless sensor J in accordance with the routing information. Upon receiving the receive acknowledgment (1) from the server M, the wireless sensor J transfers it to the wireless sensor G, which in turn transfers it to the wireless sensor E.

Upon receiving the receive acknowledgment (1), the wireless sensor E sends a standby instruction (1), with the routing identifier (1) appended, to the wireless sensor G in accordance with the routing information. The wireless sensor E deletes the routing identifier (1) from its disk 112 or memory 114 and performs the abovementioned standby process.

Upon receiving the standby instruction (1) from the wireless sensor E, the wireless sensor G transfers it to the wireless sensor J in accordance with the routing information. The wireless sensor G deletes the routing identifier (1) from its disk 112 or memory 114 and performs the abovementioned standby process.

Upon receiving the standby instruction (1) from the wireless sensor G, the wireless sensor J transfers it to the server M in accordance with the routing information. The wireless sensor J deletes the routing identifier (1) from its disk 112 or memory 114. However, the wireless sensor J does not perform the standby process but waits for the next standby instruction because the routing identifier (2) is left.

Upon receiving the standby instruction (1) from the wireless sensor J, the server M deletes the routing identifier (1) from its disk 112 or memory 114, but waits for the next standby instruction without performing the standby process because the routing identifier (2) is left. The server M sends a receive acknowledgment (2), with the routing identifier (2) appended, to the wireless sensor J, which in turn sends it to the wireless sensor K.

Upon receiving the receive acknowledgment (2) from the wireless sensor J, the wireless sensor K sends a standby instruction (2), with a routing identifier (2) appended, to the wireless sensor J in accordance with the routing information. The wireless sensor K deletes the routing identifier (2) from its disk 112 or memory 114 and performs the above-mentioned standby process.

Upon receiving the standby instruction (2) from the wireless sensor K, the wireless sensor J transfers it to the server M in accordance with the routing information. The wireless sensor J deletes the routing identifier (2) from its disk 112 or memory 114 and performs the above-mentioned standby process.

Upon receiving the standby instruction (2) from the wireless sensor J, the server M deletes the routing identifier (2) from its disk 112 or memory 114 and performs the above-mentioned standby process.

As described above, the wireless sensor according to the third embodiment, when it operates as a relay sensor for each of different routing processes at the same time, will not go into the standby state until all the routing processes are complete. Therefore, a sensor network can be constructed with higher reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless sensor for a sensor network of wireless sensors, comprising:
   a power source;
   a sensor unit configured to perform (1) a sensing process to sense at least one of environment and circumstance, (2) a first routing process to send first sensing information obtained by the sensing process to a server in accordance with routing information, and (3) a second routing process to send second sensing information from another wireless sensor to the server in accordance with the routing information, when being supplied with power from the power source;
   a timer set at a set time and including a capacitor to be charged by the power supplied from the power source and performs a time limit operation due to self-discharge of the capacitor;
   a first control switch which controls the supply of the power to the timer from the power source to make the timer perform the time limit operation at the set time;
   a rectifier which converts a radio signal from the another wireless sensor into power to output a control signal; and
   a second control switch which, upon receiving the control signal while the timer is performing the time limit operation, starts the supply of the power from the power source to the sensor unit.

2. The wireless sensor according to claim 1, wherein the first control switch controls the supply of the power from the power source to the timer to make the timer perform the time limit operation at a first time the sensor unit performs the sensing process or at a second time the sensor unit performs the first routing process, and which further comprises a third control switch which stops the supply of the power from the power source to the sensor unit until the timer performs the time limit operation at the first time or the second time and starts the supply of the power from the power source to the sensor unit when the timer performs the time limit operation at the first time or the second time.

3. The wireless sensor according to claim 1, wherein the first control switch controls the supply of the power from the power source to the timer to make the timer perform the time limit operation at a third time the sensor unit performs the second routing process.

4. The wireless sensor according to claim 3, wherein the third time is a delayed time delayed from a third time of another wireless sensor located one before the wireless sensor on a path on which the second routing process is performed, and the sensor unit sends the second sensing information upon elapse of the delayed time from a time when activation of another wireless sensor located one behind the wireless sensor on the path is confirmed.

5. The wireless sensor according to claim 1, wherein, when the sensor unit receives a standby instruction from another wireless sensor located one before the wireless sensor on path on which the second routing process is performed, the first control switch controls the supply of the power from the power source to the timer to make the timer perform the time limit operation at the time the sensor unit performs the sensing process, the first routing process, or the second routing process, and the second control switch stops the supply of the power from the power source to the sensor unit.

6. The wireless sensor according to claim 1, wherein, when the sensor unit receives standby instructions from all wireless sensors located one before the sensor on paths on witch the second routing processes are performed concurrently, the first control switch controls the supply of the power from the power source to the timer to make the timer perform the time limit operation at the time the sensor unit performs the sensing process, the first routing process, or the second routing process and the second control switch stops the supply of the power from the power source to the sensor unit.

7. A method of controlling a wireless sensor comprising:
   preparing a wireless sensor which includes a power source, and a sensor unit configured to perform (1) a sensing process to sense at least one of environment and circumstance, (2) a first routing process to send first sensing information obtained by the sensing process to a server in accordance with routing information, and (3) a second routing process to send second sensing information from another wireless sensor to the server in accordance with the routing information, when being supplied with power from the power source;
   controlling the supply of the power from the power source to a timer set at a set time and including a capacitor to be charged by the power supplied from the power source and performs a time limit operation due to self-discharge of the capacitor to make the timer perform the time limit operation at the set time;
   converting a radio signal from the different wireless sensor into power to output a control signal; and
   starting the supply of the power from the power source to the sensor unit when the control signal is output while the timer is performing the time limit operation.

8. The method according to claim 7, wherein the supply of the power from the power source to the timer is controlled to make the timer perform the time limit operation at a first time the sensor unit performs the sensing process or at a second time the sensor unit performs the first routing process, and which further comprises stopping the supply of the power from the power source to the sensor unit until the timer performs the time limit operation at the first time or the second time and starting the supply of the power from the power source to the sensor unit when the timer performs the time limit operation at the first time or the second time.

9. The method according to claim 7, wherein the supply of the power from the power source to the timer is controlled to make the timer perform the time limit operation at a third time the sensor unit performs the second routing process.

10. The method according to claim 9, wherein the third time is a delayed time delayed from a third time of another wireless sensor located one before the wireless sensor on a path on which the second routing process is performed, and the sensor unit sends the second sensing information upon elapse of the delayed time from a time activation of another wireless sensor located one behind the wireless sensor on the path is confirmed.

11. The method according to claim 7, wherein, when the sensor unit receives a standby instruction from another wireless sensor located one before the wireless sensor on path on which the second routing process is performed, the supply of the power from the power source to the timer is controlled to make the timer perform the time limit operation at the time the sensor unit performs the sensing process, the first routing process, or the second routing process, and the supply of the power from the power source to the sensor unit is stopped.

12. The method according to claim 7, wherein, when the sensor unit receives standby instructions from all wireless sensors located one before the wireless sensor on paths on which second routing processes are performed concurrently, the supply of the power from the power source to the timer is controlled to make the timer perform the time limit operation at the time the sensor unit performs the sensing process, the first routing process, or the second routing process and the supply of power from the power source to the sensor unit is stopped.

* * * * *